(12) United States Patent
Hassell

(10) Patent No.: US 10,611,518 B2
(45) Date of Patent: Apr. 7, 2020

(54) BAKERY TRAY

(71) Applicant: Rehrig Pacific Company, Los Angeles, CA (US)

(72) Inventor: Jon P. Hassell, Atlanta, GA (US)

(73) Assignee: Rehrig Pacific Company, Los Angeles, CA (US)

( * ) Notice: Subject to any disclaimer, the term of this patent is extended or adjusted under 35 U.S.C. 154(b) by 74 days.

(21) Appl. No.: 15/907,775

(22) Filed: Feb. 28, 2018

(65) Prior Publication Data

US 2018/0251260 A1     Sep. 6, 2018

Related U.S. Application Data

(60) Provisional application No. 62/465,716, filed on Mar. 1, 2017.

(51) Int. Cl.
*B65D 21/04*     (2006.01)
*B65D 21/02*     (2006.01)
(Continued)

(52) U.S. Cl.
CPC .......... *B65D 21/0215* (2013.01); *A47J 37/01* (2013.01); *B65D 1/22* (2013.01); *B65D 1/34* (2013.01);
(Continued)

(58) Field of Classification Search
CPC ............ B65D 21/0215; B65D 21/0212; B65D 21/046; B65D 71/70; B65D 1/22; B65D 1/24; B65D 85/36; A47J 37/01
(Continued)

(56) References Cited

U.S. PATENT DOCUMENTS 1,336,292 A    4/1920   Goodfriend
1,542,115 A    6/1925   Weis
(Continued)

FOREIGN PATENT DOCUMENTS

AU    2009222632 A1   4/2010
CA      2276863 A1   2/2000
(Continued)

OTHER PUBLICATIONS

One photo of "Single Height Bakery Tray" Dated before 2013.
Eight photos of "Norseman NPL 664 Bakery Tray" Dated before 2013.

*Primary Examiner* — Elizabeth J Volz
(74) *Attorney, Agent, or Firm* — Carlson, Gaskey & Olds, P.C.

(57) ABSTRACT

A tray includes a base and a pair of side walls extending upward from side edges of the base. Front and rear walls extend upward from front and rear edges of the base. The front and rear walls are shorter than the side walls. A plurality of support posts project upwardly from the upper edge of the front and rear walls. A lip is spaced outward of the front wall and the rear wall. Each lip includes a lower edge protruding downward to form columns aligned below the support posts. When stacked on a similar tray the columns contact the support posts of the similar tray to help support the front and rear walls. The base includes a recess below the columns for receiving the blade of a hand truck, which will transfer load throughout a stack of trays from columns to support posts.

16 Claims, 6 Drawing Sheets

(51) Int. Cl.
    *B65D 1/22*     (2006.01)
    *B65D 85/36*    (2006.01)
    *A47J 37/01*    (2006.01)
    *B65D 1/34*     (2006.01)
(52) U.S. Cl.
    CPC ....... *B65D 21/0212* (2013.01); *B65D 21/046* (2013.01); *B65D 85/36* (2013.01)
(58) Field of Classification Search
    USPC ........ 220/607; 206/509, 511, 557, 503, 507, 206/504, 386
    See application file for complete search history.

(56) References Cited

U.S. PATENT DOCUMENTS

| | | |
|---|---|---|
| 1,568,742 A | 1/1926 | Jung |
| 1,623,692 A | 4/1927 | Lockwood |
| 1,671,450 A | 5/1928 | Ross |
| 1,720,947 A | 7/1929 | Duggan |
| 1,730,919 A | 10/1929 | Debs |
| 1,840,310 A | 1/1932 | Debs |
| 1,953,935 A | 4/1934 | Jackson |
| 2,123,837 A | 7/1938 | Thomas et al. |
| 2,150,623 A | 3/1939 | Jackson |
| 2,232,632 A | 2/1941 | Reynolds |
| 2,896,835 A | 7/1959 | Burkhardt et al. |
| 3,155,268 A | 11/1964 | Fogerty et al. |
| 3,164,478 A | 1/1965 | Bostrom |
| 3,182,856 A | 5/1965 | Goltz |
| 3,270,913 A | 9/1966 | Bridenstine |
| RE26,350 E | 2/1968 | Wilson |
| 3,392,875 A | 7/1968 | Bockenstette |
| 3,401,828 A | 9/1968 | Bockenstette |
| 3,420,402 A | 1/1969 | Frater et al. |
| 3,438,544 A | 4/1969 | Cloyd |
| 3,478,998 A | 11/1969 | Burford |
| 3,613,943 A | 10/1971 | Bridenstine |
| D224,366 S | 7/1972 | Rehrig |
| 3,675,815 A | 7/1972 | Rehrig |
| 3,780,905 A | 12/1973 | Herolzer |
| 3,825,114 A | 7/1974 | Johnson et al. |
| 3,828,705 A | 8/1974 | Morrison |
| 3,865,239 A | 2/1975 | Herolzer et al. |
| 3,937,327 A | 2/1976 | Carroll |
| 3,951,265 A | 4/1976 | Carroll |
| 4,000,817 A | 1/1977 | Sanders et al. |
| 4,023,680 A | 5/1977 | Thurman |
| D245,648 S | 9/1977 | Taylor |
| D247,648 S | 3/1978 | Carroll et al. |
| 4,093,070 A | 6/1978 | Stahl |
| 4,093,071 A | 6/1978 | Stahl et al. |
| 4,102,453 A | 7/1978 | Carroll et al. |
| D249,185 S | 8/1978 | Carroll et al. |
| 4,106,624 A | 8/1978 | Thurman |
| 4,106,625 A | 8/1978 | Carroll et al. |
| 4,109,791 A | 8/1978 | Clipson et al. |
| D252,961 S | 9/1979 | Carroll et al. |
| 4,189,052 A | 2/1980 | Carroll et al. |
| 4,238,032 A | 12/1980 | Thurman |
| 4,320,837 A | 3/1982 | Carroll et al. |
| 4,364,477 A | 12/1982 | Stromberg |
| 4,379,508 A | 4/1983 | Miller et al. |
| 4,423,813 A | 1/1984 | Kreeger et al. |
| 4,519,503 A | 5/1985 | Wilson |
| 4,522,301 A | 6/1985 | Ajmera |
| 4,523,681 A | 6/1985 | Kreeger |
| 4,759,451 A | 7/1988 | Apps |
| 4,807,756 A | 2/1989 | Young et al. |
| 4,885,989 A | 12/1989 | Korpan |
| 4,936,458 A | 6/1990 | Tabler |
| 4,960,207 A | 10/1990 | Tabler et al. |
| 4,960,211 A | 10/1990 | Bailey |
| 4,982,844 A | 1/1991 | Madan et al. |
| 5,035,326 A | 7/1991 | Stahl |
| D319,908 S | 9/1991 | Stahl |
| 5,080,314 A | 1/1992 | Moyer et al. |
| 5,232,609 A | 8/1993 | Badinier et al. |
| 5,249,699 A | 10/1993 | Williams |
| 5,287,966 A * | 2/1994 | Stahl .................. B65D 21/041 206/503 |
| 5,292,001 A | 3/1994 | Langenbeck et al. |
| D348,138 S | 6/1994 | Lang-Ree et al. |
| D348,344 S | 6/1994 | Apps |
| D350,028 S | 8/1994 | Apps |
| 5,344,022 A | 9/1994 | Stahl |
| 5,372,257 A | 12/1994 | Beauchamp et al. |
| 5,581,902 A | 12/1996 | Didion et al. |
| 5,582,296 A | 12/1996 | Beauchamp et al. |
| 5,588,549 A | 12/1996 | Furtner et al. |
| 5,615,921 A | 4/1997 | Marley et al. |
| D382,404 S | 8/1997 | Cope |
| 5,671,857 A | 9/1997 | Stromberg |
| 5,881,902 A | 3/1999 | Ackermann et al. |
| 5,896,992 A | 4/1999 | McGrath |
| 5,921,566 A | 7/1999 | Kern et al. |
| 5,979,654 A | 11/1999 | Apps et al. |
| D439,049 S | 3/2001 | Koefelda |
| 6,260,706 B1 | 7/2001 | Koefelda |
| D446,939 S | 8/2001 | Koefelda |
| 6,273,006 B1 | 8/2001 | Reutter et al. |
| 6,273,259 B1 | 8/2001 | Stahl |
| 6,394,274 B1 | 5/2002 | Cheeseman |
| D458,684 S | 6/2002 | Bryant et al. |
| 6,607,199 B2 | 8/2003 | Gruber |
| 6,837,377 B2 | 1/2005 | Shuert |
| 6,857,642 B2 | 2/2005 | Gruber |
| 6,886,710 B2 | 5/2005 | Verna et al. |
| 6,953,116 B2 | 10/2005 | Verna et al. |
| 7,152,752 B2 | 12/2006 | Kurtenbach |
| 7,195,127 B2 | 3/2007 | Hsu et al. |
| 7,258,246 B2 | 8/2007 | Tingley |
| 7,320,405 B2 | 1/2008 | Stahl |
| 7,350,789 B2 | 4/2008 | Uffner et al. |
| 7,484,621 B2 | 2/2009 | Apps et al. |
| D598,684 S | 8/2009 | Stahl |
| 7,637,373 B2 | 12/2009 | Stahl |
| 7,686,167 B1 | 3/2010 | Stahl |
| 7,699,172 B2 | 4/2010 | McTavish et al. |
| 7,784,615 B2 | 8/2010 | Stahl |
| 7,823,728 B2 | 11/2010 | Baltz |
| 7,861,864 B2 | 1/2011 | Hassell et al. |
| 8,191,910 B2 | 6/2012 | Landau et al. |
| 8,561,832 B2 | 10/2013 | Hassell |
| 8,695,795 B1 | 4/2014 | Huber |
| 8,720,687 B2 | 5/2014 | Hassell |
| 8,763,809 B2 | 7/2014 | Baltz et al. |
| 9,156,588 B2 | 10/2015 | Hassell |
| 9,278,780 B2 | 3/2016 | Hassell et al. |
| 9,302,810 B2 | 4/2016 | Cavalcante |
| 9,540,140 B2 | 1/2017 | Hassell et al. |
| 9,902,523 B2 | 2/2018 | Baltz et al. |
| 2002/0153682 A1 | 10/2002 | Gruber |
| 2003/0020545 A1 | 1/2003 | Joly et al. |
| 2003/0183549 A1 | 10/2003 | Verna et al. |
| 2003/0205495 A1 | 11/2003 | Verna et al. |
| 2004/0050742 A1 | 3/2004 | Gruber |
| 2004/0060844 A1 | 4/2004 | Stahl |
| 2004/0144680 A1 | 7/2004 | Stahl |
| 2005/0183980 A1 | 8/2005 | Fernandez et al. |
| 2006/0070906 A1 | 4/2006 | Verna et al. |
| 2007/0175790 A1 | 8/2007 | Fernandez et al. |
| 2007/0187276 A1 | 8/2007 | Stahl |
| 2007/0187420 A1 | 8/2007 | Gruskin et al. |
| 2008/0110790 A1 | 5/2008 | McTavish et al. |
| 2008/0116099 A1 | 5/2008 | Garcia |
| 2008/0116100 A1 | 5/2008 | Hassell et al. |
| 2010/0084304 A1 | 4/2010 | Cavalcante |
| 2013/0008814 A1 | 1/2013 | Ritzberger et al. |
| 2013/0200915 A1 | 8/2013 | Panagas |
| 2015/0076028 A1 | 3/2015 | Baltz et al. |

(56) References Cited

U.S. PATENT DOCUMENTS

2016/0007737 A1 1/2016 Clark et al.
2016/0009448 A1 1/2016 Hassell

FOREIGN PATENT DOCUMENTS

| | | |
|---|---|---|
| CA | 2408247 A1 | 11/2001 |
| CA | 2448920 A1 | 7/2004 |
| DE | 20013147 U1 | 12/2000 |
| DE | 102010013284 A1 | 9/2011 |
| EP | 1911628 A1 | 4/2008 |
| EP | 1911682 A1 | 4/2008 |
| EP | 2284089 A2 | 2/2011 |
| FR | 2266638 A1 | 10/1975 |
| FR | 2391115 A1 | 12/1978 |
| FR | 2756706 A1 | 6/1998 |
| FR | 2851552 A1 | 8/2004 |
| GB | 1203403 A | 8/1970 |
| JP | 07187269 A | 7/1995 |
| WO | 9903745 A1 | 1/1999 |
| WO | 0130660 A1 | 5/2001 |
| WO | 02094665 A1 | 11/2002 |
| WO | 03039980 A1 | 5/2003 |

\* cited by examiner

BAKERY TRAY

BACKGROUND

Plastic bakery trays include a base and side walls extending upward from side edges of the base. Front and rear walls are often shorter than the side walls to provide access to the baked goods (or other items) in the trays when they are loaded and stacked.

When loaded and stacked, the trays are supported on one another on the side walls, with the base and front and rear walls suspended from one side wall to the other. If a stack of loaded trays are moved by means of a hand truck, the blade of the hand truck may be inserted under the base, in the center of the front or rear walls. This may cause the center of the trays to deflect upward.

SUMMARY

A tray includes a base and a pair of side walls extending upward from side edges of the base. Front and rear walls extend upward from front and rear edges of the base. The front and rear walls are shorter than the side walls.

A plurality of support posts project upwardly from the upper edge of the front and rear walls. A lip is spaced outward of the front wall and the rear wall. Each lip includes a lower edge protruding downward to form columns aligned below the support posts.

When stacked on a similar tray the columns contact the support posts of the similar tray to help support the front and rear walls. The base includes a recess below the columns for receiving the blade of a hand truck, which will transfer load throughout a stack of trays from columns to support posts. The columns and support posts reduce the deflection of the trays when lifted by a hand truck.

DETAILED DESCRIPTION OF THE PREFERRED EMBODIMENT

Figure 1:
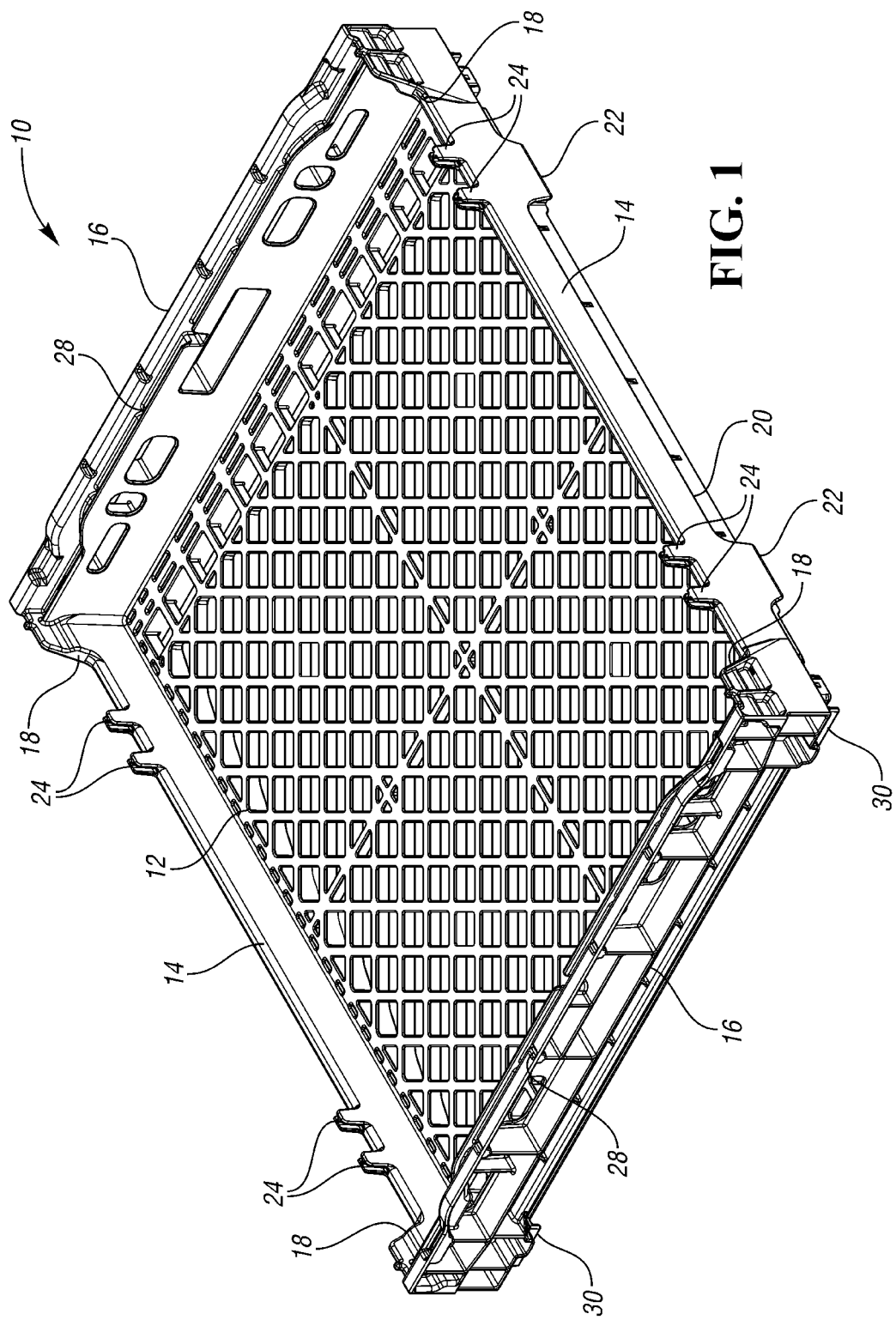
FIG. 1 is a perspective view of a tray according to a first embodiment.

A bakery tray 10 according to one embodiment of the present invention is shown in FIG. 1. The bakery tray 10 includes a base 12, which may be a grid or lattice of interconnected ribs, front and rear walls 14 and side walls 16. The front and rear walls 14 each include an upper edge which is lower than that of the side walls 16. Side flanges 18 extend inwardly onto the front and rear walls 14 from the side walls 16.

The front and rear walls 14 each include a lip 20 projecting outward and then downward from an upper edge of the front wall 14 and rear wall 14. The lip 20 may be connected to the front wall 14 and rear wall 14 at the upper edge of the front wall 14 and rear wall 14 and/or by vertical ribs connecting the lips 20 to the front wall 14 and rear wall 14. At two points spaced just inward of the side flanges 18 the lip 20 extends downward to form columns 22. Above each of the columns 22, a pair of support posts 24 project upward from the upper edge of the front and rear walls 14. In the example shown, each of the support posts includes a portion supported by and contiguous with the lip and a portion supported by and contiguous the front wall, with a transverse rib connecting the two portions.

A channel 28 is formed on the upper edge of each of the side walls 16. Feet 30 project downward from the side walls 16. The feet 30 are aligned with the channels 28.

Figure 2:
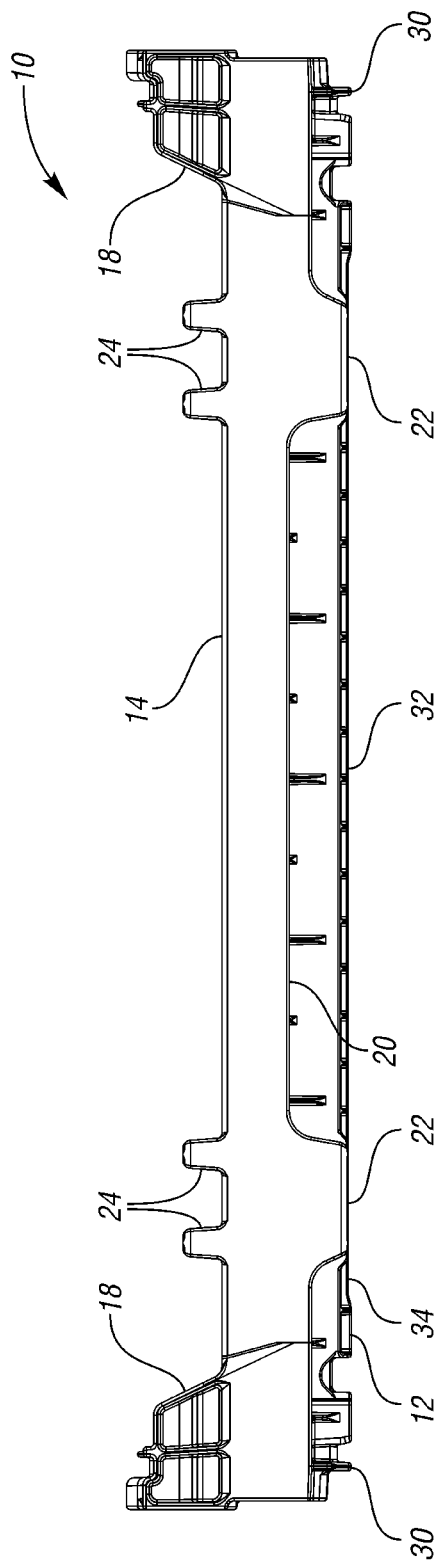
FIG. 2 is a front view of the tray of FIG. 1.

FIG. 2 is a front view of the tray 10. Again, the lip 20 projects downward to form two columns 22. There are two support posts 24 projecting upward from the front wall 14 above each of the columns 22. The support posts 24 are spaced inward from the side flanges 18. The base 12 includes a recess 34 centered on the front and rear walls 14 and extending outward just outward of the columns 22. The base 12 also includes a chamfer 32 just inward of the columns 22.

Figure 3:
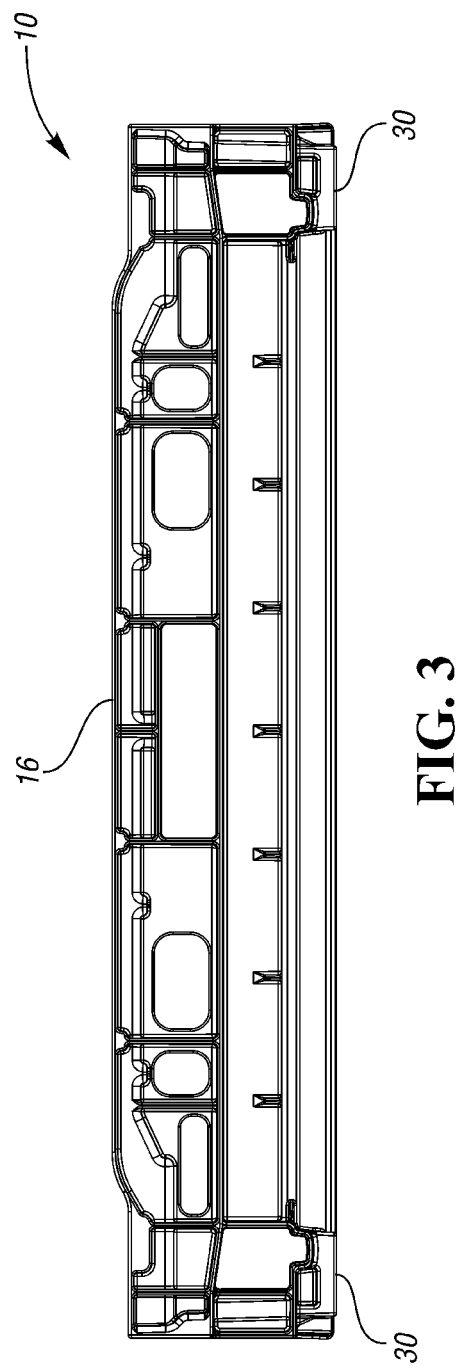
FIG. 3 is a side view of the tray of FIG. 1.

FIG. 3 is a side view of the tray 10. The feet 30 project downward from the side walls 16.

Figure 4:
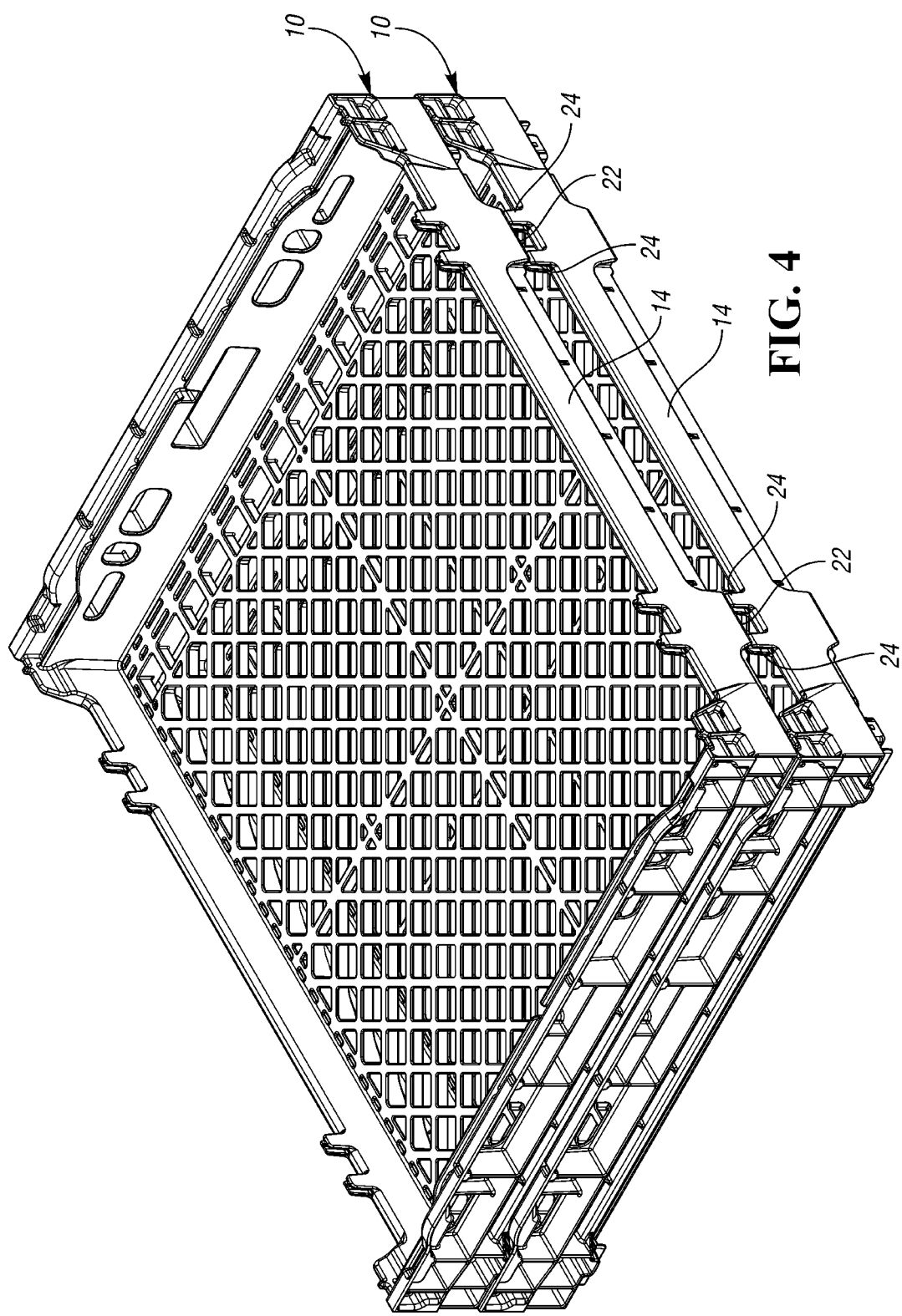
FIG. 4 is a perspective view of the tray of FIG. 1 stacked on an identical tray.

FIG. 4 shows the tray 10 with an identical tray 10 stacked thereon. As is known, the feet 30 of the upper tray 10 are received in the channels 28 of the lower tray 10. On the front and rear walls 14, the support posts 24 of the lower tray 10 are aligned with the columns 22 of the upper tray 10. The support posts 24 either contact or nearly contact the columns 22 (in which case they would contact the columns under load or if deflected by a hand truck).

Figure 5:
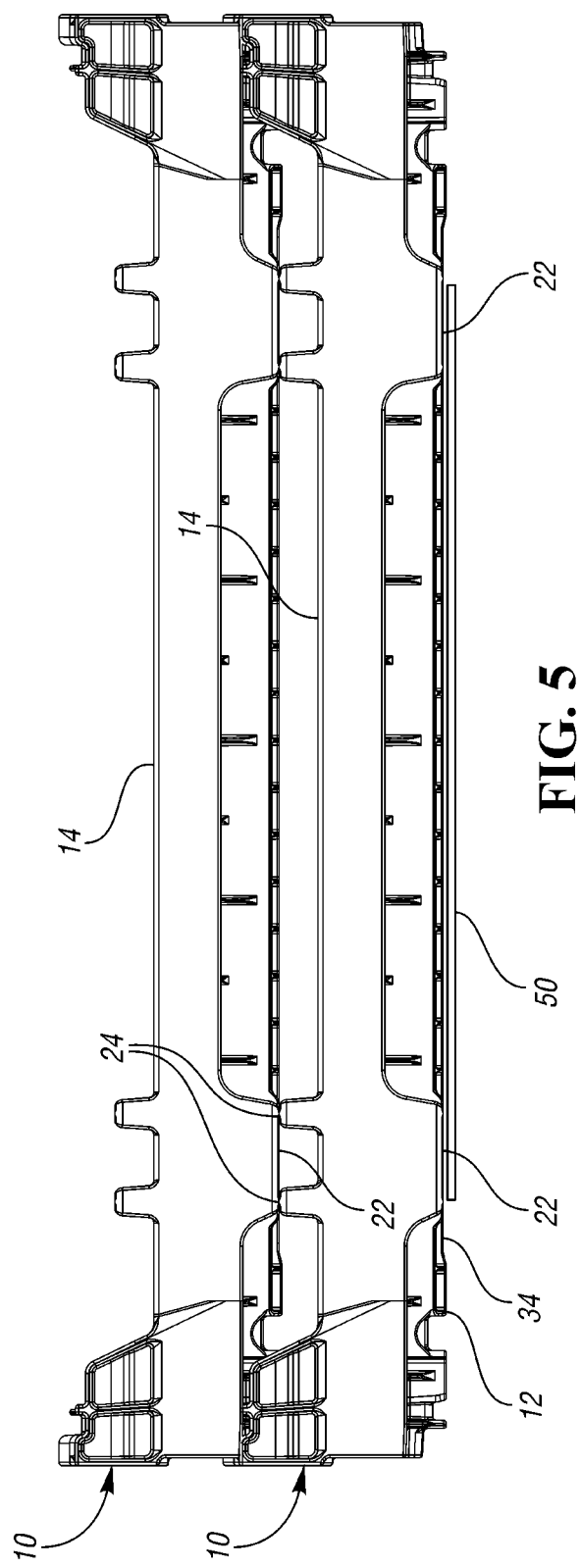
FIG. 5 is a front view of the trays of FIG. 4.

FIG. 5 is a front view of the trays 10 of FIG. 4. As shown, the blade 50 of a hand truck can be received in the recess 34 in the base 12 of the lower tray 10. The width of the blade 50 aligns with the columns 22 and the support posts 24.

When a stack of loaded trays 10 is lifted by a hand truck with the blade 50 entering one of the front and rear walls 14, the weight of the trays 10 is primarily transferred from the upper trays 10 to the lower trays 10 via the side walls 16, which are outward of the blade 50. This causes the trays 10 to bend until the support posts 24 contact the columns 22. The support posts 24 and columns 22 reduce the cantilever section from the contact point of the blade 50 to the transfer of load in the stack of the trays 10. This reduces the amount of flexing by the trays 10, thereby protecting the product in the trays 10 and increasing the life of the trays 10.

Figure 6:
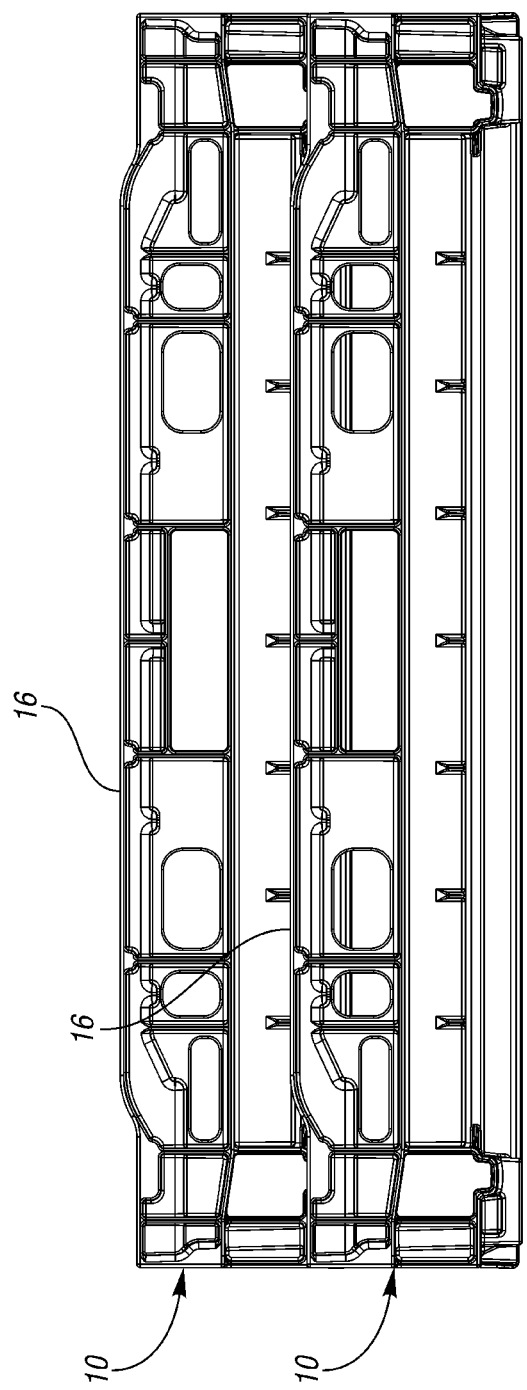
FIG. 6 is a side view of the trays of FIG. 4.

FIG. 6 is a side view of the stacked trays 10.

Figure 7:
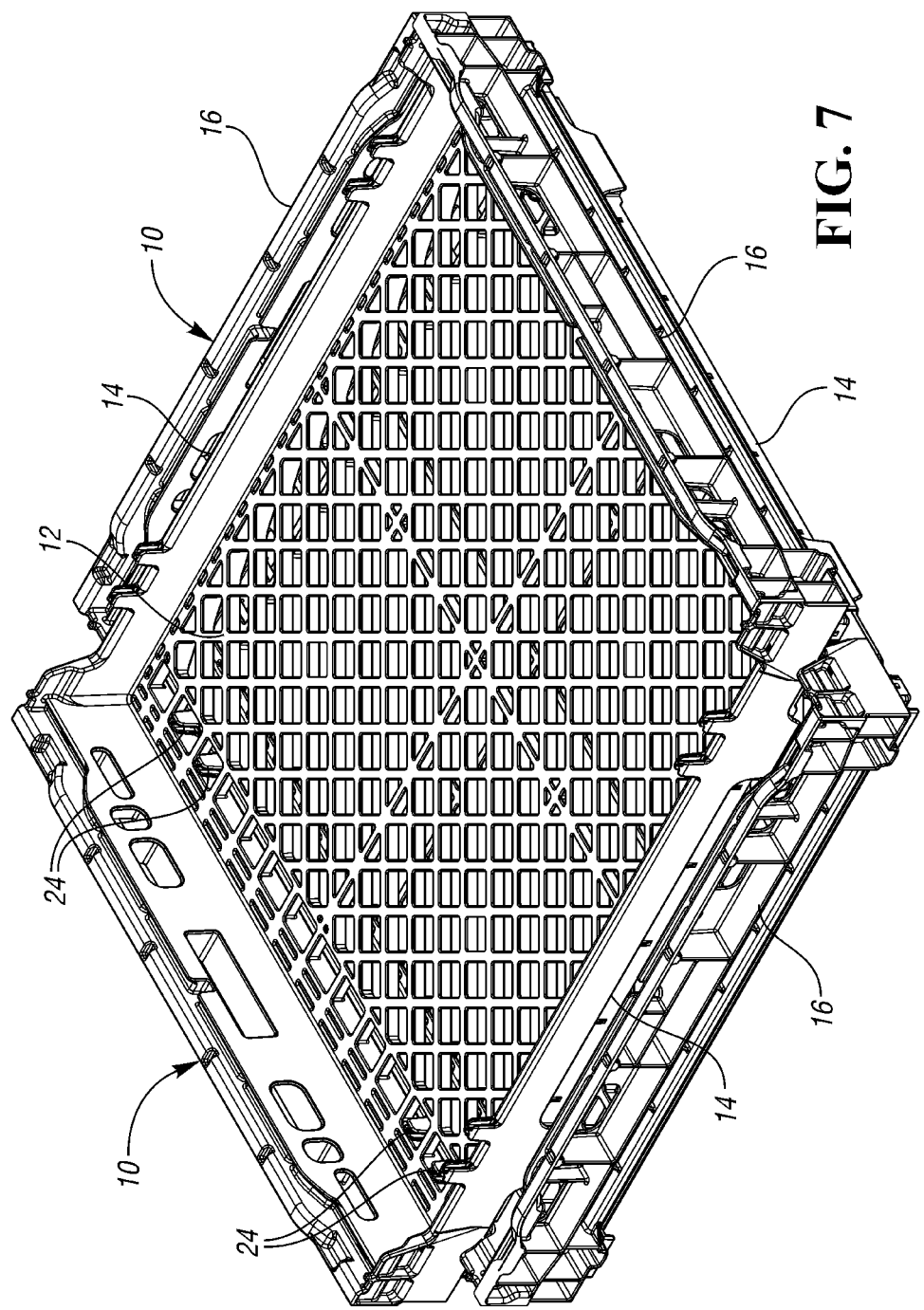
FIG. 7 shows the trays of FIG. 4 cross-stacked.

When empty, the trays 10 can be cross-stacked as shown in FIG. 7. Cross-stacking the empty trays 10 reduces their height and volume for more efficient transportation and storage. As is known, when cross-stacked, the front and rear walls 14 of the upper tray 10 extend perpendicularly to, and are supported in contact on, the front and rear walls 14 of the lower tray 10 between the side flanges 18. The support posts 24 of the lower tray 10 project through the lattice openings in the base 12 of the upper tray 10.

Each example tray 10 is injection molded as a single piece of suitable plastic, such as HDPE.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A tray comprising:
  a base;
  a pair of side walls extending upward from side edges of the base to upper edges of the side walls, wherein the upper edges of the side walls each include a channel, wherein each side wall includes a pair of feet projecting downward capable of being received in the channels of a similar tray stacked thereunder;

a front wall extending upward from a front edge of the base, wherein the front wall includes an upper edge that is lower than the upper edges of the side walls;

a pair of side flanges extending inwardly from the side walls above the front wall;

a plurality of support posts projecting upwardly from the upper edge of the front wall; and a lip spaced outward of the front wall and connected to the front wall, the lip including a lower edge protruding downward to form columns, wherein the plurality of support posts are aligned directly above the columns.

2. The tray of claim 1 wherein two of the plurality of support posts are spaced inward from one of the side flanges and two of the plurality of support posts are spaced inward of the other of the side flanges.

3. The tray of claim 2 wherein the columns each include a lowermost edge co-planar with a lower edge of a portion of the base directly inward of the respective column.

4. The tray of claim 3 wherein the base includes a recess below the front wall and columns, wherein the recess is inward of the side walls.

5. The tray of claim 4 wherein the columns are configured to contact the support posts of the similar tray stacked thereunder.

6. The tray of claim 5 further including a rear wall extending upward from a rear edge of the base, wherein an upper edge of the rear wall is shorter than the side walls, a plurality of rear support posts extending upward from the upper edge of the rear wall above a pair of rear columns projecting downward.

7. A tray comprising:

a base;

a pair of side walls extending upward from side edges of the base to upper edges of the side walls, wherein the upper edges of the side walls each include a channel, wherein each side wall includes a pair of feet projecting downward capable of being received in the channels of a similar tray stacked thereunder;

a front wall extending upward from a front edge of the base, wherein the front wall includes an upper edge that is lower than the upper edges of the side walls;

a pair of side flanges extending inwardly from the side walls above the front wall;

a plurality of support posts projecting upwardly from the upper edge of the front wall; and a lip spaced outward of the front wall and connected to the front wall, the lip including a lower edge protruding downward to form columns, wherein each of the support posts includes a portion supported by the lip and a portion supported by the front wall.

8. The tray of claim 7 wherein the plurality of support posts are aligned above the columns.

9. The tray of claim 8 wherein each of the support posts includes a transverse rib connecting the portion supported by the lip and the portion supported by the front wall.

10. The tray of claim 9 stacked on the similar tray such that the support posts of the similar tray contact the columns of the tray.

11. A tray comprising:

a base;

a pair of side walls extending upward from side edges of the base to upper edges of the side walls, wherein the upper edges of the side walls each include a channel, wherein each side wall includes a pair of feet projecting downward capable of being received in the channels of a similar tray stacked thereunder;

a pair of opposed short walls extending upward from front and rear edges of the base, wherein the short walls each include an upper edge that is lower than the upper edges of the side walls;

a pair of side flanges extending inwardly from the side walls above each of the short walls;

a plurality of support posts projecting upwardly from the upper edge of the short walls between the side flanges; and a lip spaced outward of each of the short walls and connected to the short walls, the lip including a lower edge protruding downward to form columns aligned below the support posts, wherein the columns each include a lowermost edge co-planar with a lower edge of a portion of the base directly inward of the respective column.

12. The tray of claim 11 wherein the base includes a recess below the front wall and columns, wherein the recess is inward of the side walls.

13. The tray of claim 12 wherein the columns are configured to contact the support posts of the similar tray stacked thereunder.

14. The tray of claim 13 wherein each of the support posts includes a portion supported by the lip and a portion supported by the front wall.

15. The tray of claim 14 wherein each of the support posts includes a transverse rib connecting the portion supported by the lip and the portion supported by the front wall.

16. The tray of claim 15 stacked on the similar tray such that the support posts of the similar tray contact the columns of the tray.

* * * * *